United States Patent [19]

Stiff et al.

[11] 4,367,802

[45] Jan. 11, 1983

[54] AUTOMATIC STEERING MECHANISM FOR USE ON APPARATUS FORMING BEDS OF UNIFORM WIDTHS AND ROWS OF UNIFORM SPACING

[75] Inventors: Alonzo B. Stiff; Gilbert L. Harris, both of Brawley, Calif.

[73] Assignee: Russell Eugene Jordan, Brawley, Calif.

[21] Appl. No.: 237,870

[22] Filed: Feb. 25, 1981

Related U.S. Application Data

[63] Continuation of Ser. No. 88,412, Oct. 26, 1979, abandoned.

[51] Int. Cl.³ .............................................. B62D 5/06
[52] U.S. Cl. .................................. 180/131; 104/244.1
[58] Field of Search ............... 180/131, 79; 104/244.1; 172/26; 280/776

[56] References Cited

U.S. PATENT DOCUMENTS

| | | | |
|---|---|---|---|
| 1,952,496 | 3/1934 | Graham | 104/244.1 |
| 2,465,660 | 3/1949 | Phillips | 104/244.1 |
| 3,708,029 | 1/1973 | Sedgfield et al. | 104/244.1 |

*Primary Examiner*—John A. Pekar
*Attorney, Agent, or Firm*—Flehr, Hohbach, Test, Albritton & Herbert

[57] ABSTRACT

Automatic steering mechanism for use on apparatus for forming beds of uniform widths and rows of uniform spacing. The apparatus is of a type comprising a self-propelled vehicle having a steering apparatus for steering the vehicle, and a ground engaging implement carried by the vehicle for forming an indentation in the ground. The steering mechanism is comprised of a framework structure adapted to be secured to the front end of the vehicle. A boom structure is provided and is mounted on the framework for pivotal movement about a horizontal axis. An arm is also provided and is pivotally mounted on the outer extremity of the boom structure for rotation about a horizontal axis substantially parallel to the first named horizontal axis. An indentation following device is carried by each end of the arm. The indentation following device is capable of following an indentation in the ground made by the ground engaging implement in a previous pass through the field. A source of hydraulic fluid under pressure is provided and a steering valve connected to the source of hydraulic fluid. A control linkage connects the arm to the control valve. The control valve is connected to the steering apparatus whereby when the indentation following device causes operation of the steering valve hydraulic fluid will be supplied to the steering apparatus to automatically steer the vehicle in accordance with movement of the indentation following device.

31 Claims, 9 Drawing Figures

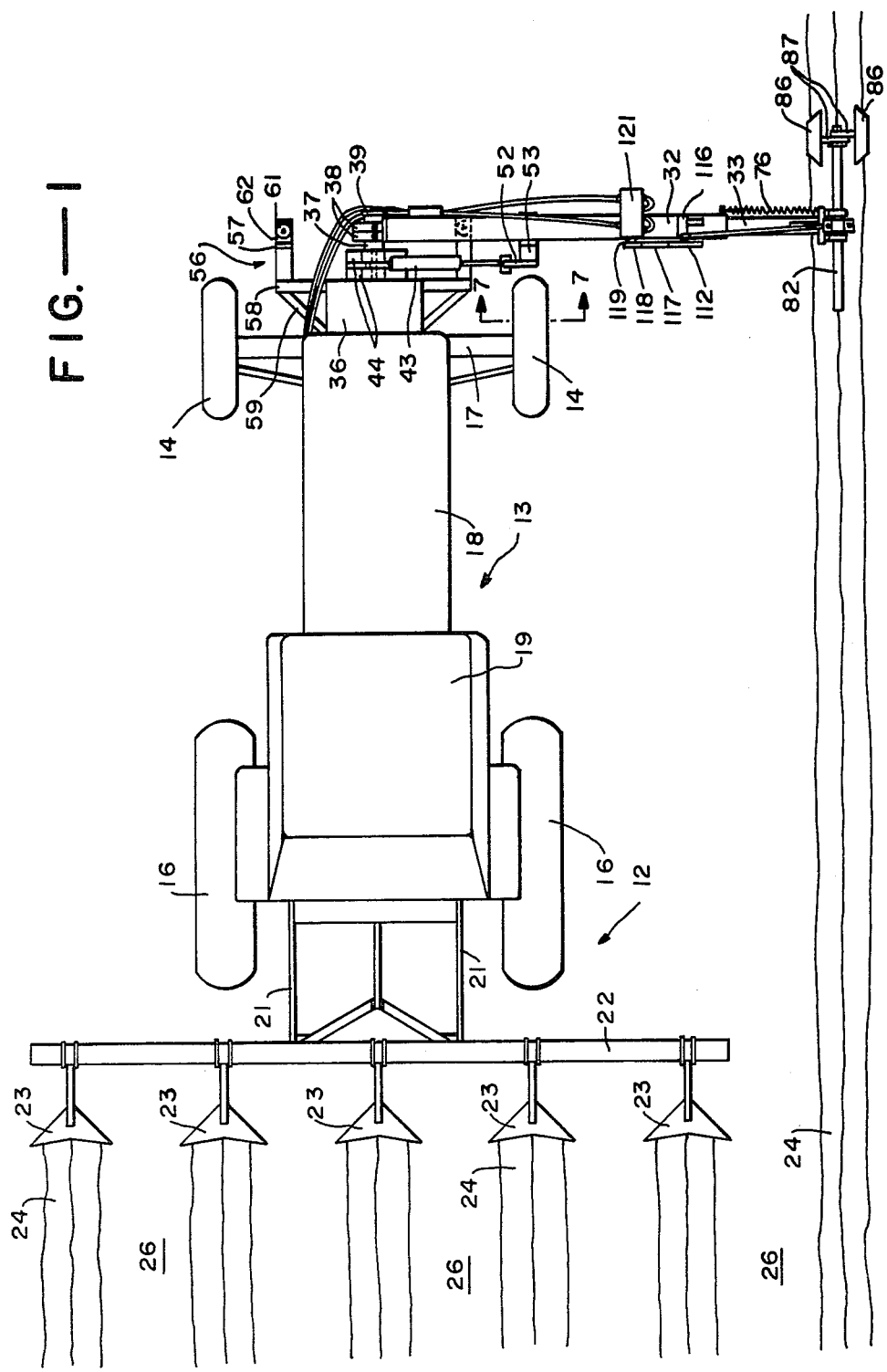
FIG.—1

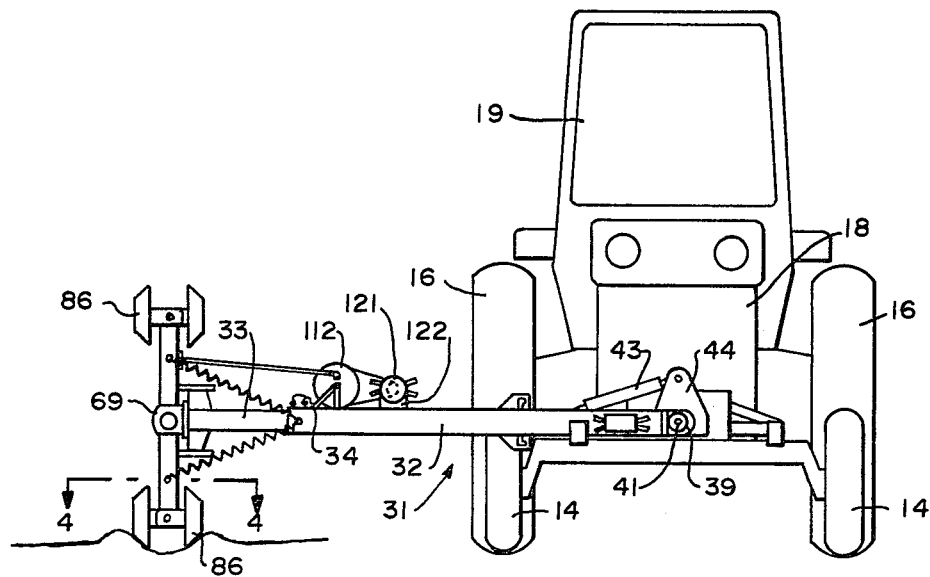
FIG.—2
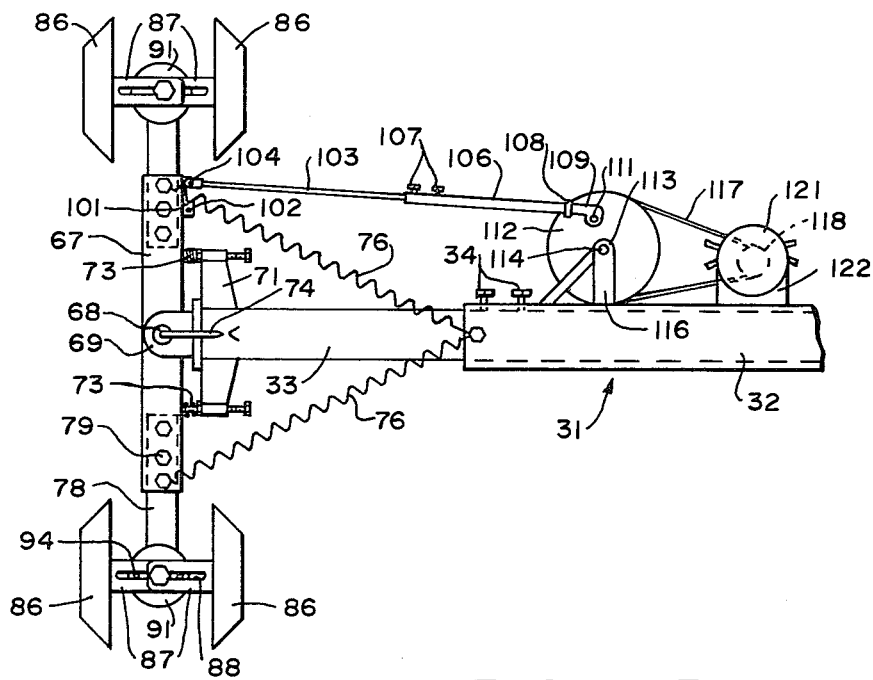
FIG.—3

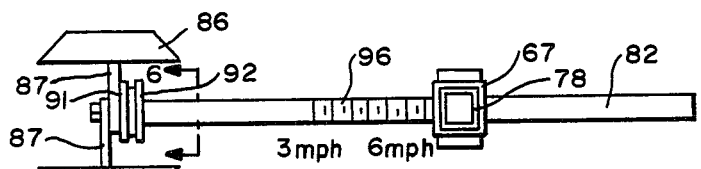
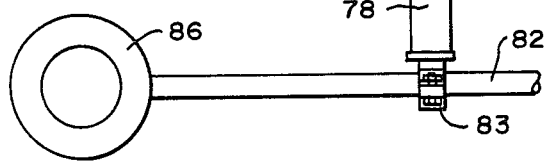
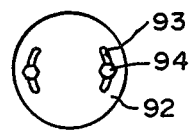
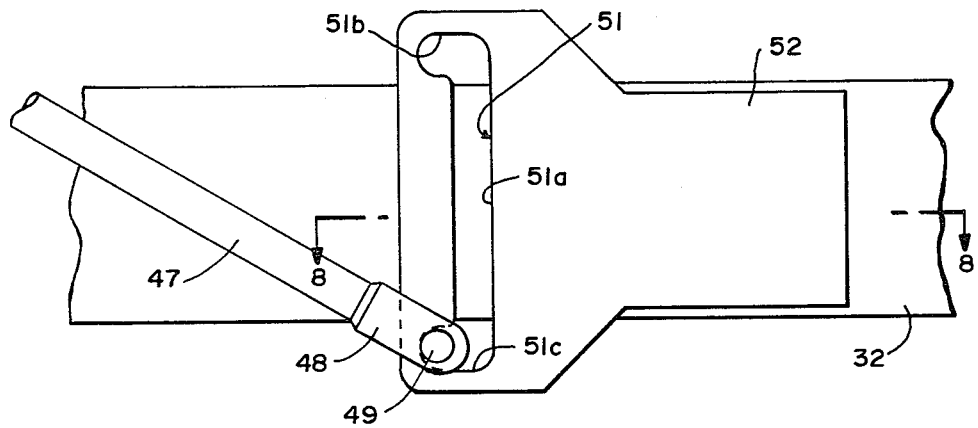
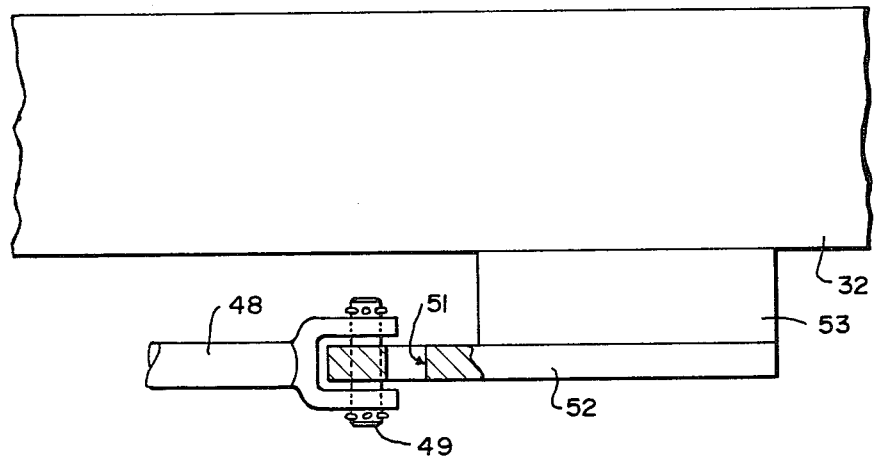

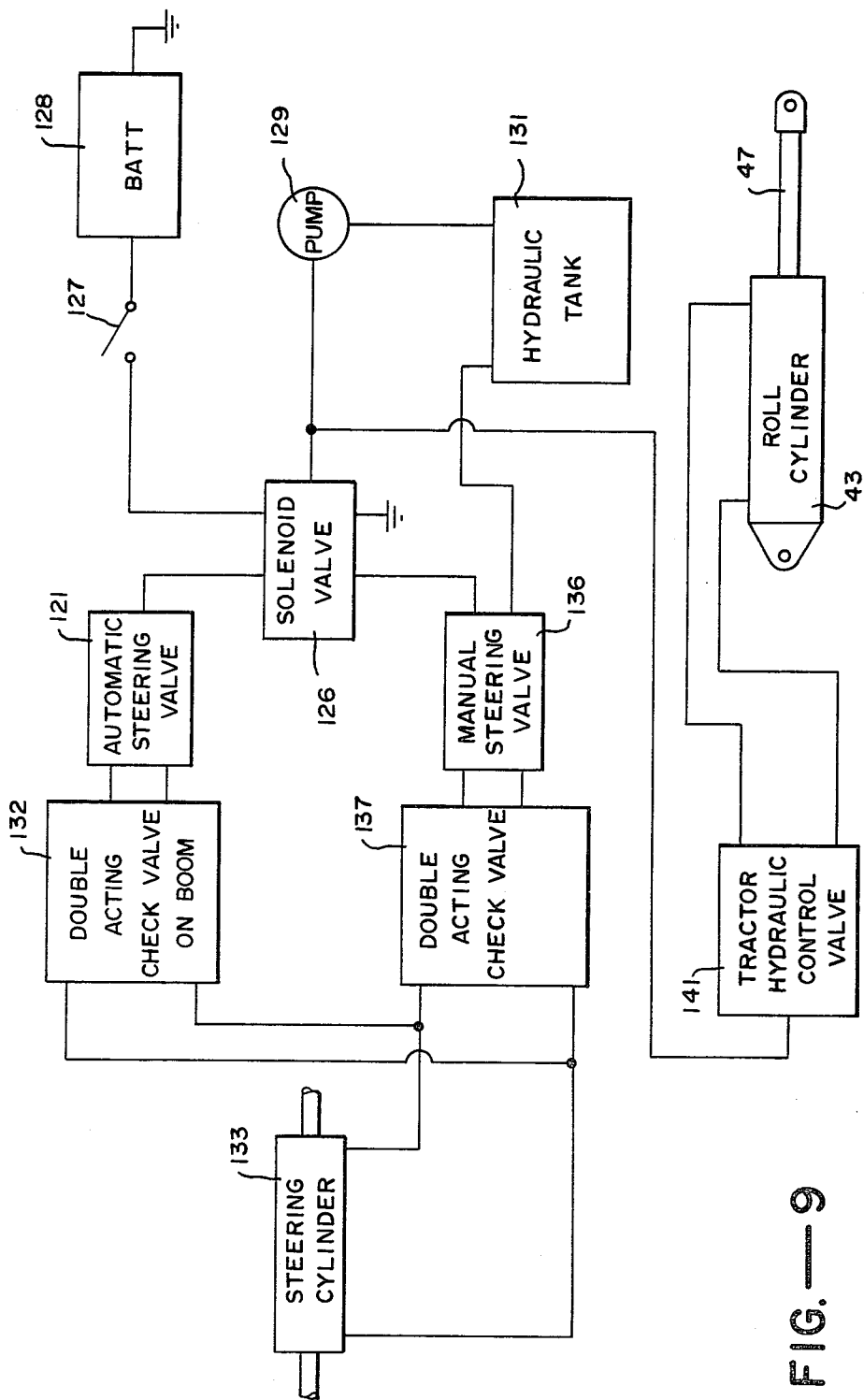
FIG.—9

AUTOMATIC STEERING MECHANISM FOR USE ON APPARATUS FORMING BEDS OF UNIFORM WIDTHS AND ROWS OF UNIFORM SPACING

This is a continuation of application Ser. No. 088,412, filed Oct. 26, 1979, now abandoned.

This invention relates to an automatic steering mechanism for use on apparatus for forming beds of uniform widths and rows of uniform spacing and which is the type which can be retrofitted onto existing apparatus or which can be utilized on new apparatus.

In the past, mechanical markers have been utilized with various types of agricultural equipment to make a mark in the field as the operator is steering the equipment in its first pass through the field. During the subsequent pass through the field, the operator of the equipment utilizes the mark which has been made to visually steer the equipment in the field for the next pass through the field. It has been found that utilizing equipment of this type requires a skilled operator, and in addition requires that the operator sit on the tractor or equipment in the same position at all times in order to make beds of the same width or to provide uniform spacing between rows. It is well known that to use other equipment in connection with the tending of row crops planted in this manner that uniform width beds and uniform spacing between rows is very important. For example, if the rows or beds are not of uniform widths, multi-row cultivators, for example, will cultivate out those plants which are out of alignment. In the meantime, it has become more difficult to obtain skilled labor for operating such agricultural equipment. There is therefore a need for a new and improved mechanism which can be utilized with agricultural equipment to facilitate the forming of beds with uniform width and rows with uniform spacing.

In general, it is an object of the invention to provide an automatic steering mechanism for use on apparatus for forming beds of uniform width and rows of uniform spacing.

Another object of the invention is to provide a mechanism of the above character which can be operated with relatively unskilled personnel.

Another object of the invention is to provide a mechanism of the above character with which greater accuracy can be obtained even though there is a side draft on the apparatus.

Another object of the invention is to provide a mechanism of the above character which is capable of being utilized after dark.

Another object of the invention is to provide a mechanism of the above character which utilizes a single boom structure which can be used on opposite sides.

Another object of the invention is to provide a mechanism of the above character in which the boom structure is maintained in a horizontal position relative to the apparatus.

Another object of the invention is to provide a mechanism of the above character in which the boom structure is pivoted for swinging movement about a horizontal axis.

Another object of the invention is to provide a mechanism of the above character in which erratic steering is minimized.

Another object of the invention is to provide a mechanism of the above character in which the lead time can be readily adjusted.

Another object of the invention is to provide a mechanism of the above character which can be readily retrofitted onto existing apparatus.

Another object of the invention is to provide a mechanism of the above character which also can be provided on new apparatus.

Another object of the invention is to provide a mechanism of the above character which is relatively simple and which can be readily mounted on and readily removed from the equipment.

Another object of the invention is to provide a mechanism of the above character in which the boom structure can be stowed in a generally vertical position so that the equipment can readily level down roads and highways.

Additional objects and features of the invention will readily appear from the following description in which the preferred embodiments are shown in the accompanying drawings.

FIG. 1 is a top plan view of an automatic steering mechanism incorporating the present invention mounted on an apparatus for forming beds of uniform width.

FIG. 2 is a front elevational view of the automatic steering mechanism shown in FIG. 1.

FIG. 3 is an enlarged front elevational view of a portion of the steering mechanism shown in FIG. 2.

FIG. 4 is a top plan view showing a portion of the steering mechanism and the manner in which it is calibrated for different speeds of travel of the equipment on which it is mounted.

FIG. 5 is a front side elevational view of the portion of the mechanism shown in FIG. 4.

FIG. 6 is a cross sectional view taken along the line 6—6 of FIG. 4.

FIG. 7 is an enlarged view looking along the line 7—7 of FIG. 1.

FIG. 8 is a cross sectional view taken along the lines 8—8 of FIG. 4.

FIG. 9 is a schematic diagram of the hydraulic system utilizing in conjunction with the automatic steering mechanism.

In general, the automatic steering mechanism is for use on apparatus for forming beds of uniform width and rows of uniform spacing. The apparatus is the type which is comprised of a self-propelled vehicle having a steering mechanism for steering the vehicle. Typically, a ground engaging implement is carried by the vehicle for forming an indentation in the ground. The implement can be in the form of a lister or coulter for forming a physical indentation which can be used as a mark in the ground. The steering mechanism comprises a boom structure which is secured to the front end of the vehicle. A hydraulic mechanism is provided for causing pivoting of the boom structure about a horizontal axis to move the same from one side to the other of the equipment. An arm is pivotally mounted on the outer end of the boom structure. An indentation follower is carried by the arm for following the indentation in the ground made by the ground engaging implement during previous pass through the field. A steering motor is provided for steering the vehicle. A control device is connected to the steering motor. A linkage is provided for connecting the arm to the control device whereby pivotal movement of the arm under the control of the indentation follower causes operation of the control device to control the steering motor to thereby steer the vehicle.

More specifically, as shown in the drawings, the automatic steering mechanism incorporating the present invention is mounted upon an apparatus 12 which is utilized for forming beds or rows. This apparatus 12 includes a self propelled vehicle 13 of the conventional type such as a Series 986 tractor manufactured by International Harvester. The vehicle 13 can be of any suitable type, as for example, it can be a track laying vehicle or alternatively it can be a wheeled vehicle which is provided with front and rear wheels 14 and 16 mounted upon a frame 17. The frame 17 carries an engine or a motor 18 on the forward extremity of the same. A cab 19 is also mounted upon the frame 17 and includes controls (not shown) therein which are utilized for operating the self propelled vehicle 13.

The tractor or vehicle 13 is provided with a conventional three-point hitch 21 which has mounted thereon a tool bar 22. The tool bar 22 carries a plurality of spaced apart lister bottoms 23 which are utilized for forming ditches or furrows 24 one of which serves as an indentation to be followed as hereinafter described. The furrows 24 are spaced apart so as to provide spaced apart parallel raised beds 26 having uniform widths.

The automatic steering mechanism 11 consists of a boom structure 31. The boom structure 31 includes an outer boom 32 and an inner boom 33. The outer boom 32 is formed of suitable material such as 4"×4" rectangular steel. The inner boom 33 is also formed of rectangular steel of a size which is slidably mounted within the outer boom 32. The inner boom 33 can be slidably mounted in any desired position with respect to the outer boom 32 and is held in place by set screws 34 threaded into the outer boom structure 32 and adapted to engage the inner boom 33.

The boom structure 31 is adapted to be removably secured to the front end of the tractor 13 by suitable means. Thus, there is provided a box-like structure 36 formed of heavy steel plate which is bolted to the side frame members of the tractor 73 to hold it firmly in place. A stub shaft 37 is welded to the front surface of the box-like structure 36 and extends in a forward direction. The shaft is positioned so that it is substantially in line with the longitudinal axis of the tractor and serves as a horizontal axis. Pillow block type sleeve bearings 38 are rotatably mounted on the stub shaft 37 and are secured to the proximate end of the boom structure 31. The sleeve bearings 38 are of a conventional type and are retained on the stub shaft 37 by a circular plate 39 which serves as a washer. The washer 39 is retained on the stub shaft 37 by a cap screw 41.

Means is provided for moving the boom structure 31 about the pivot axis formed by the stub shaft 37 and consists of a hydraulic actuator 42. The cylinder 43 of the hydraulic actuator 42 is pivotally connected to a clevis 44 which is secured to a bracket 46 mounted on the forward extremity of the box-like structure 36. The piston 47 of the hydraulic actuator 42 has a clevis 48 on its end. A pin 49 is removably mounted in the clevis 48 (see FIGS. 7 and 8) and extends into a slot 51 provided in a plate 52. The plate 52 is secured to the rear side of the outer boom 32 and is spaced therefrom by a mounting block 53 that is secured to the boom 32 and to the plate 52 by suitable means such as welding. As can be seen, a slot 51 is provided with an elongate relatively straight portion 51a which extends in a direction which is substantially at right angles to the longitudinal axis of the boom structure 32. The extremities of the portion 51a are provided with recessed portions at 51b and 51c which open into the portion 51a but which extend toward the proximate end of the outer boom 32. The pin 49 is adapted to travel within the slot 51 and as hereinafter described during the time when the boom structure is used for the guiding operation, the pin 49 is free to float in the portion 51a. When the boom structure 31 is being raised or lowered, the pin 49 will seat in one of the recesses 51b and 51c depending upon which side of the vehicle 13 the boom structure is positioned as hereinafter described. By positioning the pin 49 in one of the recesses 51a or 51b, it is possible to lift the boom structure 31 when it is desired to swing the boom structure from one side of the tractor 13 to the other.

Means is provided for supporting the boom structure 31 in a generally horizontal position on each of the two sides of the tractor 13 in the form of a saddle assembly 56 carried by the tractor 13 on opposite sides of the stub shaft 37. The saddle assembly 56 consists of a U shaped saddle member 57 which is secured to an L-shaped member 58 mounted upon the box-like structure 36. The member 58 is reinforced by a brace 59 extending between the member 58 and the box like structure 36. A plurality of washers 61 are provided upon the bottom upwardly facing suface 62 of the U-shaped saddle member 57 and are secured to the member 57 by a bolt 63. The number of washers 61 can be varied to maintain the boom structure 31 in a generally horizontal position when it is resting within the saddle assembly 56.

A guiding assembly 66 is pivotally mounted on the outer of distal end of the inner boom 33 and consists of an arm 67 in the form of a square tube which has a pair of stub shafts 68 welded to opposite ends of the arm 67 and extend in a forward direction to provide horizontal axes which extend in a direction parallel to the horizontal axis formed by stub shaft 37. The shafts 68 are pivotally mounted in pillow block bearings 69 secured to the outer extremity of the inner boom 33. The arm 67 generally extends in a direction at right angles to the longitudinal axis of the inner boom 33. Means is provided for limiting the pivotal movement of the arm 67 and consists of brackets 71 (see FIG. 3) welded on opposite sides of the inner boom 33. Large cap screws 72 are threaded into the ends of the bracket 71 and are adapted to be positioned so as to serve as stops for the arm 67 so as to limit the pivotal movement of the arm 67 to a relatively small angle. Springs 73 are carried by the cap screws 72 and the bracket 71 and serve to yieldably center the arm 67 so that it is in generally a vertical direction. Thus, it can be seen that the bracket 71 with the associated cap screws 72 serve to prevent excess tilting of the arm 67 when the boom structure 31 is raised and moved from one side of the tractor to the other. A pointer 74 is mounted on one of the stub shafts 68 and the cap screws 72 are adjusted so that in normal operation, the arm 67 will be at right angles to the longitudinal axis of the inner boom 33.

Means is provided for dampening the movement of the arm 67 during operation of the automatic steering mechanism as hereinafter described and consists of a pair of dampening springs 76. One end of the springs is secured to the outer extremity of the arm 67 whereas the other end is secured to the outer distal end of the outer boom 32.

An arm extension 78 is carried by each end of the arm 67. The extension is in the form of a small square tube which is slidably mounted within the arm 67 and which is retained in the desired position by a set screw 79. A plate 81 is welded to the outer extremity of each arm extension 78. A pipe 82 is secured to each of the plates 81 by suitable means such as a clamp 83 which can be loosened and tightened to permit sliding movement of the pipe 82 therein to adjust the position of the pipe 82 in a direction longitudinally of the pipe in accordance with the speed of travel of the tractor 13.

Means is provided for following an indentation in the ground and in the embodiment shown consists of a pair of cone-shaped guide wheels 86. As shown, the cone-shaped guide wheel 86 are in the form of truncated cones. The guide wheels 86 are carried by bearings (not shown) which are rotatably mounted on shafts (not shown) that are mounted on the ends of the arms 87. The arms 87 are provided with slots 88 extending longitudinally of the arms. A cap screw 89 extends through the slots 88 and into a circular plate 91. The circular plate 91 is adapted to be rotated with respect to a flange 92 that is secured to the outer extremity of the pipe 82. Means is provided to permit limited rotation of the circular plate 91 with respect to the flange 92. This is accomplished by providing a pair of arcuate slots 83 in the flange 92. Cap screws 94 extend through the slots 93 and are threaded into the plate 91 and serve to hold the plate 91 in a predetermined angular position with respect to the flange 92. Thus, it can be seen that limited rotation, as for example up to 5°, can be accomplished.

The spacing between the cone shaped guide wheels 86 can be adjusted by use of the cap screws 89 extending through the slots 88 so that they travel in the closest furrow 24 provided between the raised beds. As can be seen with the arrangement shown, the cone-shaped guide wheels are positioned so that they can travel ahead of the tractor 13 for a purpose hereinafter described. The pipe 82 is provided with graduations 96 which are used for adjusting the pipe 82 in accordance with the speed of the tractor.

Means is provided for sensing the movement of the cone-shaped guide wheels 86 relative to the outer boom structure 32 and consists of a bracket 101 which is secured by suitable means such as welding to the arm 67 carrying the cone-shaped wheels 86. The bracket 101 is provided with a plurality of vertically spaced holes 102. A rod 103 which is provided with a clevis 104 has one end pivotally secured to the bracket 101 by securing the clevis 104 through one of the holes 102 provided in the bracket. The rod 103 is slidably mounted in a pipe 106 and is retained in the pipe 106 in a predetermined position by set screws 107. A nut 108 is welded to the other end of the tube 106. A bolt 109 is threaded into the nut 108. The bolt 109 is provided with a mallett end which is secured by a bolt 111 to a sprocket 112. The sprocket 112 is carried by a bushing 113 which is rotatably mounted upon a stub shaft 114. The stub shaft 114 is supported by a triangularly-shaped pedestal 116 which is mounted upon the outer boom 32. The sprocket 112 drives a chain 117 which drives a smaller sprocket 118. The sprockets 112 and 118 have a suitable tooth ratio, as for example, five to one. The sprocket 118 is mounted on the input shaft 119 of a steering control valve 121 of a type which is conventionally supplied with an International Harvester 986 tractor. The valve 121 is secured by a bracket 122 to the outer boom 32.

The steering control valve 121 forms a part of a hydraulic system which is schematically illustrated in FIG. 9. As shown in FIG. 9, the automatic steering valve can be selected by operation of the solenoid operated valve 126. The solenoid operated valve 126 can be operated by closing the switch 127 connected to a battery 128. When the switch 127 is closed, the solenoid operated valve 126 is operated to supply hydraulic fluid from a pump 129 mounted on the tractor 13 and driven by the tractor. The pump 129 obtains hydraulic fluid from a tank 131 also mounted on the tractor. Hydraulic fluid is thus supplied through the automatic steering valve 121 under the control of the cone shaped guide wheels 86 as hereinafter described. Hydraulic fluid from the valve 121 is supplied through a double acting check valve 132 to a steering cylinder 133 which is a conventional part of the tractor 13 and which is utilized for steering the front wheels 14 of the tractor.

When the switch 121 is opened, the solenoid operated valve 126 is deenergized so that hydraulic fluid is supplied from the pump 129 to a manual steering valve 136. The manual steering valve 136 is controlled by the steering wheel (not shown) of the tractor in a conventional manner. Hydraulic fluid which is passed by the valve 136 is supplied to a double acting check valve 137 that is mounted beneath the tractor 13. Fluid is supplied from the check valve 137 to the steering cylinder 133 to place the steering of the front wheels 14 under control of the manual steering wheel provided in the cab of the tractor. Hydraulic fluid is also supplied from a manual control valve 141 provided within the cab of the tractor so that fluid is supplied to the roll cylinder 43 for controlling movement of the boom structure 31 as hereinafter described.

In connection with the present invention, it has been found that it is important to tailor the size of the automatic steering valve 121 which is utilized so that it is identical to the manual steering valve 136 which is utilized with the conventional steering mechanism on the tractor.

Operation of the automatic steering mechanism may now be briefly described as follows: Let it be assumed that the automatic steering mechanism is mounted on a tractor as hereinbefore described and that it is being utilized by an operator. Let it also be assumed that the steering is under automatic operation and that the operator is nearing the end of the field in which he is performing operations such as forming a plurality of raised beds by forming furrows 24 between the same by use of lister bottoms 23 carried by the tool bar 22 mounted upon the tractor 13. As the tractor reaches the end of the field, the operator in the tractor cab operates the control switch 127 which controls the manual steering valve 136, and places the tractor under the control of the manual steering wheel in the tractor cab. As soon as this has been accomplished, the hydraulic control valve 141 is operated by a lever (not shown) within the tractor cab to supply hydraulic fluid to the roll cylinder 43. Assuming that the boom structure is on the left hand side of the tractor as viewed from the front as shown in FIG. 1, the roll cylinder 43 is operated to bring the pin 49 down into the recess 51c after which the roll cylinder 43 is operated to lift the boom structure and the cone-shaped guide wheels 86 carried thereby upwardly so that the cone-shaped guide wheels clear the furrow. Additional hydraulic fluid is supplied to the roll cylinder 43 to cause it to be operated to raise the boom structure and to swing it about its horizontal pivot axis formed by stub shaft 37.

During the time that the boom structure is being raised, the tractor can be turned in the field so that it can advance down the field in the opposite direction. As the boom structure 31 is raised so that it is in a substantially vertical position, it enters what may be called a dead center position after which it will continue to roll over or through this dead center position because of the momentum from the swinging movement of the boom structure. After movement through dead center, the weight of the boom structure throws the pin 49 out of the indentation or recess 51c, and the pin 49 advances through the slot 51a until it engages the other recess 51b. Thereafter the pin 49 is utilized for lowering the boom structure 31 to the other side of the tractor. Assuming that the tractor has by this time turned about in the field and is ready to advance down the field, the tractor is positioned so that the other set of cone-shaped guide wheels 86 will be lowered into the ditch or furrow 24 which is closest to the tractor. As soon as the boom structure 31 has been lowered so that it rests in the saddle 56, the pin 49 will again clear the recess 51c.

As soon as the cone-shaped guide wheels 86 are disposed in the furrow 24 and are guided by the furrow 24, the steering of the tractor can be switched so that it is placed under the control of the cone-shaped guide wheels 86 by operating the switch 27 to cause energization of the solenoid operated valve 126 to supply the hydraulic fluid to the automatic steering valve 121. The automatic steering valve 121 like the manual steering valve 136 supplies hydraulic fluid to the steering cylinder 136 to control the steering of the front wheels. The automatic steering valve 121 is controlled by the chain 117 and is driven by the sprocket 112. The sprocket 112 is driven by the linkage hereinbefore described which is connected to the vertical arm 67 which carries the cone-shaped guide wheels 86.

As can be seen in FIG. 1, the cone-shaped guide wheels are positioned so that they are substantially in front of the forward extremity of the tractor 13. It has been found that it is desirable to place these guide wheels substantially ahead of the tractor in order to provide sufficient lead time to steer the tractor in a proper manner. It has been found that the reaction time of the automatic steering system which is utilized with the tractor varies with the forward speed of the tractor. In order to obtain proper operation, it has been necessary to adjust the distance that the cone-shaped guide wheels 86 are in front of the tractor. It is for this reason that graduations 76 are provided on the pipe 82. From the graduations 76 it can be seen that the faster the tractor is moving, as for example six miles per hour, the farther ahead the cone-shaped guide wheels 86 must be positioned to provide sufficient lead time for the automatic control to prevent hunting. Conversely, when the tractor is moving at a slower speed, the spacing of the guide wheels 86 ahead of the tractor is decreased.

Numerous adjustments have been provided on the automatic steering mechanism. For example, the boom structure 31 by use of the inner and outer booms 33 and 32 can be adjusted to accommodate various widths of beds as for example beds 30 inches in width to 40 inches in width. Similarly, an adjustment has been provided to ensure that the boom structure is normally resting in a substantially horizontal position with the cone-shaped guide wheels 86 being disposed within the furrow 24. This is accomplished by the adjustment of the arm extensions 78 in the arm 67. It is important to maintain the boom structure 31 in a substantially horizontal position. If the boom is above or below the horizontal position, the distance to the center of the tractor is decreased which will affect the accuracy of the steering system.

Also it can be seen that the sets of cone-shaped guide wheels 86 which are mounted at both ends of the arm 67 are centered with respect to the pivot axis formed by stub shafts 68 so that in each trip through the field, the boom structure is maintained in a horizontal position.

It can be seen that when the tractor moves sideways towards or away from the furrow which is being followed by the cone-shaped guide wheels, the cone-shaped guide wheels will cause pivotal movement of the arm 67 about its horizontal pivot axis 68. This will cause movement of the linkage to cause rotation of the sprocket 112. This in turn causes operation of the automatic steering valve 121 to supply the hydraulic fluid to the steering cylinder 133 to steer the tractor to bring it back onto course.

The linkage which controls the position of the sprocket 112 is adjustable in length for two reasons. One is to adjust for different row widths. The second is to prevent excessive rotation of the sprocket 112. As hereinbefore pointed out, stops are provided on the inner boom 33 to prevent excessive movement of the arm 67 and in turn to prevent excessive movement of the sprocket 112. This prevents the sprocket 112 from rotating far enough so that it could get out of synchronism with the movement of the cone-shaped guide wheels 86. Normally, in adjusting the linkage connecting the sprocket 112 to the arm 67, the tractor wheels 14 are pointed in a straight-forward direction and thereafter the linkage connected to the cone-shaped guide wheel 86 is adjusted so that the arm 67 is in a vertical position.

When the operator again reaches the other end of the field, the same procedure is undertaken as hereinbefore described with the boom structure being moved back to the other side and again positioning the cone-shaped guide wheels 86 so that they are disposed in the furrow 24 closest to the tractor 13.

It would be the normal practice in starting a field, that the first furrows 24 would be formed by manually steering the tractor. Thereafter, all the remaining furrows in the field would be formed by having the cone-shaped guide wheels engage one of the furrows already formed and to guide the tractor through the field as hereinbefore described. The other furrows and beds in the field would be made by following the furrows which are first made.

Thus, for example, if there is a slight bend in the first four furrows, this would be duplicated throughout the field so that there still would be a uniform width between the beds. This is of great advantage for future operations carried on in the field, as for example in cultivation and harvesting where it is necessary to have each row be uniformly spaced from the other rows.

By providing a boom structure which can be swung from one side to the other, one complete guiding system has been eliminated. In order to achieve accuracy, it should be noted that the cone-shaped guide wheels which form a portion of the steering mechanism are mounted on a vertical arm which pivots about a horizontal axis that is in line with the horizontal axis of the boom. The boom structure 31, as explained previously, is maintained in a horizontal position with respect to the tractor. Thus, for example, if the tractor should happen to have low tires, or the ground be soft, the boom saddle assembly 56 is adjusted so that the boom is still substantially horizontal. The dampening springs 76 are provided to provide smoothness of operation of the steering motor without any substantial hunting or erratic steering.

It should be appreciated that as shown, the cone-shaped guide wheels are vertically disposed. However, if desired, the cone shaped guide wheels can be canted at an angle. However, this is not as desirable because it may place a side draft on the steering mechanism. It is generally preferable to have the cone shaped guide wheels be vertical so that the two wheels can engage opposite sides of the furrow and be in contact with the furrow at all times to ensure proper steering of the tractor. Since the furrows are utilized for steering, it is possible for the tractor operator to operate the tractor after dark.

Since the boom structure which is utilized can be moved upwardly into a substantially vertical position, the vehicle readily can be moved down roadways, through bridges, and the like.

Although the automatic steering mechanism has been described as being used with a conventional four-wheeled tractor, it is possible to utilize such a steering mechanism in connection with an articulated type of tractor by supplying hydraulic fluid from the automatic steering valve 121 to the two hydraulic cylinders which are conventionally used for steering such an articulated tractor.

As can be seen from the foregoing, the automatic steering mechanism which has been provided is relatively simple to construct and can be readily mounted to retrofit existing tractors with automatic steering. Also, it should be appreciated that such an automatic steering mechanism readily can be incorporated onto the tractor at the time of manufacture.

It should be appreciated that although the automatic steering mechanism has been described principally in connection with raised beds, it also can be utilized in conjunction with crops planted on flat land. When such is the case, a coulter can be utilized in place of the cone-shaped guide wheels 86. It is well known to those skilled in the art that a coulter will run approximately 6 or 7 inches deep in the ground and can be utilized for establishing a physical mark in the soil which can be followed by a coulter in the next pass through the field. By way of example, the coulter used for making a mark could be placed on the tool bar of a corn planter to form an indentation in the field which thereafter can be engaged and followed by a coulter carried by the boom structure to guide the tractor in its next pass through the field.

It is apparent from the foregoing that there has been provided an automatic steering apparatus which can be utilized on tractors for forming beds of uniform widths and rows of uniform spacing.

It is claimed:

1. In an automatic steering mechanism for use on apparatus for forming beds of uniform widths and rows of uniform spacing, the apparatus being of a type comprising a self-propelled vehicle having a steering apparatus for steering the vehicle, and a ground engaging implement carried by the vehicle for forming an indentation in the ground, the steering mechanism comprising a framework structure adapted to be secured to the front end of the vehicle, a boom structure, means for mounting the boom structure on the framework for pivotal movement about a horizontal axis, an arm, means pivotally mounting the arm on the outer extremity of the boom structure for movement about a horizontal axis substantially parallel to the first named horizontal axis, and so that it extends in a direction generally perpendicular to the direction in which the boom structure extends, indentation following means carried by an end of the arm, remote from the pivotal mounting of the arm, means for adjusting the spacing of the indentation following means with respect to the forward extremity of the vehicle to accommodate various speeds of travel for the vehicle, said indentation following means being capable of following an indentation in the ground made by the ground engaging implement in a previous pass through the field, a source of hydraulic fluid under pressure, a steering valve connected to the source of hydraulic fluid, a control linkage connecting said arm to said control valve and means adapted to connect said control valve to said steering apparatus whereby when said indentation following means causes operation of the steering valve hydraulic fluid will be supplied to the steering apparatus to automatically steer the vehicle in accordance with movement of the indentation following means.

2. A mechanism as in claim 1 wherein said boom structure is mounted on an axis parallel to the longitudinal axes of the vehicle so that it may be swung from one side of the vehicle to the other and wherein said arm is pivotally mounted intermediate its ends to said boom structure together with indentation following means carried by the other end of said arm remote from the pivotal mounting of the arm.

3. A mechanism as in claim 2 together with means for causing swinging movement of said boom structure about said first named horizontal axis from one side of the vehicle to the other side of the vehicle.

4. A mechanism as in claim 3 together with stops carried by said boom structure for limiting the pivotal movement of said arm.

5. A mechanism as in claim 3 together with means for positioning said indentation following means so that it is disposed ahead of said vehicle.

6. A mechanism as in claim 3 wherein said means causing swinging movement of said boom structure includes a plate secured to said boom structure and having an elongate slot oriented transversely to the boom, said slot having recesses at opposite ends thereof, a pin mounted in said slot and a hydraulic actuator secured to said pin for causing movement of said pin in said slot and into said recesses.

7. A mechanism as in claim 1 together with means adapted to be secured to the tractor for maintaining the boom structure in a substantially horizontal position while in use.

8. A mechanism as in claim 1 wherein the indentation following means includes a pair of cone-shaped guide wheels.

9. A mechanism as in claim 1 together with means secured to said arm for dampening the motion of said arm.

10. A mechanism as in claim 1 wherein said control linkage includes a sprocket rotatably mounted on said boom structure, means coupling said sprocket to said steering valve, and means connecting said sprocket to said arm whereby as said arm pivots about its pivot axis a rotational movement is imparted to said sprocket.

11. A mechanism as in claim 1 wherein said boom structure includes inner and outer boom members and wherein said inner boom member can be adjustably positioned within said outer boom structure.

12. A mechanism as in claim 1 together with means for adjusting the position of said indentation following means with respect to said arm.

13. A mechanism as in claim 1 wherein said means for adjusting the spacing of the indentation following means includes a member, clamping means for securing said member to one end of said arm so that said member extends in a forward direction from said arm, said indentation following means being secured to the forward extremity of said member, said clamping means permitting adjustment of said member in a direction longitudinally of the member to adjust for changes in the speed of travel of the vehicle.

14. In an automatic steering mechanism for use on apparatus for forming beds of uniform widths and rows of uniform spacing, the apparatus being of a type comprising a self-propelled vehicle having a steering apparatus for steering the vehicle, and a ground engaging implement carried by the vehicle for forming an indentation in the ground, the steering mechanism comprising a framework structure adapted to be secured to the front end of the vehicle, a boom structure, means for mounting the boom structure on the framework for pivotal movement about a horizontal axis parallel to the longitudinal axis of the vehicle whereby said boom structure may be swung from one side of the vehicle to the other, an arm, means pivotally mounting the arm intermediate its ends on the outer extremity of the boom structure for rotation about a horizontal axis substantially parallel to the first named horizontal axis, indentation following means carried by each end of the arm, said indentation following means being capable of following an indentation in the ground made by the ground engaging implement in a previous pass through the field, a source of hydraulic fluid under pressure, a steering valve connected to the source of hydraulic fluid, a control linkage connecting said arm to said control valve and means adapted to connect said control valve to said steering apparatus whereby when said indentation following means causes operation of the steering valve hydraulic fluid will be supplied to the steering apparatus to automatically steer the vehicle in accordance with movement of the indentation following means.

15. A mechanism as in claim 14 together with means for causing swinging movement of said boom structure about said first named horizontal axis from one side of the vehicle to the other side of the vehicle.

16. In an automatic steering mechanism for use on apparatus for forming beds of uniform widths and rows of uniform spacing, the apparatus being of a type comprising a self-propelled vehicle having a steering apparatus for steering the vehicle, and a ground engaging implement carried by the vehicle for forming an indentation in the ground, the steering mechanism comprising a framework structure adapted to be secured to the front end of the vehicle, a boom structure, means for mounting the boom structure on the framework for pivotal movement about a horizontal axis parallel to the longitudinal axis of the vehicle, an arm, means pivotally mounting the arm intermediate its ends on the outer extremity of the boom structure for rotation about a horizontal axis substantially parallel to the first named horizontal axis, indentation following means carried by each end of the arm, means secured to said arm for dampening the motion of said arm, stops carried by said boom structure for limiting the pivotal movement of said arm, said indentation following means being capable of following an indentation in the ground made by the ground engaging implement in a previous pass through the field, a source of hydraulic fluid under pressure, a steering valve connected to the source of hydraulic fluid, a control linkage connecting said arm to said control valve and means adapted to connect said control valve to said steering apparatus whereby when said indentation following means causes operation of the steering valve hydraulic fluid will be supplied to the steering apparatus to automatically steer the vehicle in accordance with movement of the indentation following means.

17. In an automatic steering mechanism for use on apparatus for forming beds of uniform widths and rows of uniform spacing, the apparatus being of a type comprising a self-propelled vehicle haivng a steering apparatus for steering the vehicle, and a ground engaging implement carried by the vehicle for forming an indentation in the ground, the steering mechanism comprising a framework structure adapted to be secured to the front end of the vehicle, a boom structure, means for mounting the boom structure on the framework for pivotal movement about a horizontal axis parallel to the longitudinal axis of the vehicle, an arm, means pivotally mounting the arm intermediate its ends on the outer extremity of the boom structure for rotation about a horizontal axis substantially parallel to the first named horizontal axis, indentation following means carried by each end of the arm, said indentation following means being capable of following an indentation in the ground made by the ground engaging implement in a previous pass through the field, a source of hydraulic fluid under pressure, a steering valve connected to the source of hydraulic fluid, a control linkage connecting said arm to said control valve and means adapted to connect said control valve to said steering apparatus whereby when said indentation following means causes operation of the steering valve hydraulic fluid will be supplied to the steering apparatus to automatically steer the vehicle in accordance with movement of the indentation following means, said control linkage including a sprocket rotatably mounted on said boom structure, means coupling said sprocket to said steering valve, and means controlling said sprocket to said arm whereby as said arm pivots about its pivot axis a rotational movement is imparted to said sprocket.

18. In an automatic steering mechanism for use on apparatus for forming beds of uniform widths and rows of uniform spacing, the apparatus being of a type comprising a self-propelled vehicle having a steering apparatus for steering the vehicle, and a ground engaging implement carried by the vehicle for forming an indentation in the ground, the steering mechanism comprising a framework structure adapted to be secured to the front end of the vehicle, a boom structure, means for mounting the boom structure on the framework for pivotal movement about a horizontal axis parallel to the longitudinal axis of the vehicle, an arm, means pivotally mounting the arm intermediate its ends on the outer extremity of the boom structure for rotation about a horizontal axis substantially parallel to the first named horizontal axis, indentation following means carried by each end of the arm, means for adjusting the position of each of said indentation following means with respect to said arm, said indentation following means being capable of following an indentation in the ground made by the ground engaging implement in a previous pass through the field, a source of hydraulic fluid under pressure, a steering valve connected to the source of hydraulic fluid, a control linkage connecting said arm to said control valve and means adapted to connect said control valve to said steering apparatus whereby when said indentation following means causes operation of the steering valve hydraulic fluid will be supplied to the steering apparatus to automatically steer the vehicle in accordance with movement of the indentation following means.

19. In an automatic steering mechanism for use on apparatus for forming beds of uniform widths and rows of uniform spacing, the apparatus being of a type comprising a self-propelled vehicle having a steering apparatus for steering the vehicle, and a ground engaging implement carried by the vehicle for forming an indentation in the ground, the steering mechanism comprising a framework structure adapted to be secured to the front end of the vehicle, a boom structure, means for mounting the boom structure on the framework for pivotal movement about a horizontal axis parallel to the longitudinal axis of the vehicle, an arm, means pivotally mounting the arm intermediate its ends on the outer extremity of the boom structure for rotation about a horizontal axis substantially parallel to the first named horizontal axis, indentation following means, said indentation following means being capable of following an indentation in the ground made by the ground engaging implement in a previous pass through the field, a source of hydraulic fluid under pressure, a steering valve connected to the source of hydraulic fluid, a control linkage connecting said arm to said control valve and means adapted to connect said control valve to said steering apparatus whereby when said indentation following means causes operation of the steering valve hydraulic fluid will be supplied to the steering apparatus to automatically steer the vehicle in accordance with movement of the indentation following means, means carried by each end of the arm for mounting said indentation following means on each end of the arm and for positioning said indentation following means so that they are disposed ahead of said vehicle, said means for mounting and for positioning said indentation following means including means for adjusting the distance that the indentation following means are spaced ahead of the vehicle to accommodate various speeds of travel for the vehicle.

20. In an automatic steering mechanism for use on apparatus for forming beds of uniform widths and rows of uniform spacing, the apparatus being of a type comprising a self-propelled vehicle having a steering apparatus for steering the vehicle, and a ground engaging implement carried by the vehicle for forming an indentation in the ground, the steering mechanism comprising a framework structure adapted to be secured to the front end of the vehicle, a boom structure, means for mounting the boom structure on the framework for pivotal movement about a horizontal axis parallel to the longitudinal axis of the vehicle, an arm, means pivotally mounting the arm intermediate its ends on the outer extremity of the boom structure for rotation about a horizontal axis substantially parallel to the first named horizontal axis, indentation following means carried by each end of the arm, a member for each indentation following means, clamping means for securing said member to one end of said arm so that said member extends in a forward direction from said arm, said indentation following means being secured to the forward extremity of said member, said clamping means permitting adjustment of said member in a direction longitudinally of the member to adjust for changes in the speed of travel of the vehicle, said indentation following means being capable of following an indentation in the ground made by the ground engaging implement in a previous pass through the field, a source of hydraulic fluid under pressure, a steering valve connected to the source of hydraulic fluid, a control linkage connecting said arm to said control valve and means adapted to connect said control valve to said steering apparatus whereby when said indentation following means causes operation of the steering valve hydraulic fluid will be supplied to the steering apparatus to automatically steer the vehicle in accordance with movement of the indentation following means.

21. In an agricultural apparatus with an automatic positioning mechanism, a framework, means for supporting the framework in a position above the ground for movement over the ground, said framework having first and second portions in which one portion can be shifted in position with respect to the other portion, an arm, means for pivotally mounting said arm on said second portion of the framework on a horizontal axis extending longitudinally of the second portion of the framework and parallel to the path of travel of the second portion of the framework, said arm depending downwardly at a predetermined angle from the pivotal mounting means, a ground engaging member carried by the arm for following a predetermined path, actuator means coupled between the first and second portions of the framework for causing movement of one portion of the framework with respect to the other portion of the framework, power means responsive to the movement of said arm from said predetermined angle with respect to the pivotal mounting means and coupled to said actuator means for causing operation of the actuator means to automatically position one portion of said framework with respect to the other portion of said framework so that the second portion of the framework travels along a path which is parallel to said predetermined path.

22. Apparatus as in claim 21 wherein said framework is the framework of a self-propelled vehicle and wherein said arm is carried by the vehicle and wherein said power means causes automatic steering of said vehicle.

23. Apparatus as in claim 21 together with a self-propelled vehicle, wherein said framework is carried by said vehicle, wherein an agricultural implement is carried by the framework.

24. Agricultural apparatus as in claim 21 together with a self-propelled vehicle and wherein said framework is connected to said self-propelled vehicle for movement therewith.

25. In an agricultural apparatus with an automatic steering mechanism for use in fields having raised beds or ridges and furrows or lowered beds with uniform spacing, said apparatus being of a type comprising a self-propelled vehicle having a steering apparatus for steering the vehicle and a ground engaging implement carried by the vehicle for forming a guiding surface such as provided by an indentation or ridge formed in the ground along the path of travel of the vehicle as the vehicle moves, said steering mechanism comprising a framework adapted to be secured to the vehicle, a boom structure, means mounting the boom structure on the framework for pivotal movement about a first horizontal axis extending longitudinally of the vehicle, an arm, means for pivotally mounting said arm on the outer extremity of the boom structure for pivotal movement about a second horizontal axis substantially parallel to the first horizontal axis, said arm extending in a generally vertical direction from the pivotal mounting means and generally perpendicular to the direction in which the boom structure extends, a follower carried by the end of the arm remote from the pivotal mounting of the arm, said follower being capable of following said guiding surface in the ground made by the ground-engaging implement in the previous pass through the field, a steering assembly for causing steering of the self-propelled vehicle, and power means responsive to movement of said arm about the pivotal mounting means from its generally vertical position to control the movement of said steering assembly whereby movement of said arm causes operation of the steering assembly to automatically steer the vehicle in accordance with the movement of the follower.

26. An apparatus as in claim 25 wherein the guiding surface comprises a furrow between beds and wherein said follower is adapted to move longitudinally along the furrow, and means connecting said follower to said arm.

27. Apparatus as in claim 26 wherein said means connecting said follower to said arm includes a swivel assembly.

28. Apparatus as in claim 27 wherein said swivel assembly permits limited rotational movement of said follower about the second horizontal axis.

29. Apparatus as in claim 28 wherein said means for connecting said follower to said arm also includes means for limiting pivotal movement of said follower about a vertical axis.

30. Apparatus as in claim 29 wherein said swivel assembly includes a first plate mounted in a fixed position relative to the arm, a second plate affixed to the follower, and means permitting limited rotational motion of one plate with respect to the other plate including a stop member affixed to one of the plates and extending through an arcuate slot in the other of said plates.

31. In an agricultural apparatus, a self-propelled vehicle including a framework having first and second portions, one portion of said framework being capable of being shifted in position with respect to the other portion, an arm, means for pivotally mounting said arm on the second portion of the framework for movement about an axis parallel to the path of travel of said second portion, said arm extending generally in a downward direction from the pivotal mounting means for the arm at a predetermined angle, a ground engaging member carried by the arm for following a predetermined path, actuator means coupled between the first and second portions of the framework for causing steering movement of one portion of the framework with respect to the other portion of the framework, power means responsive to the movement of said arm about the pivotal mounting means from said predetermined angle and coupled to said actuator means for causing operation of the actuator means to automatically position one portion of said framework with respect to the other portion of said framework so that the self-propelled vehicle is steered along a path which is parallel to the predetermined path.

* * * * *